April 4, 1967 F. TEMPLE 3,312,481
AUTOMATIC HOSE CONNECTOR FOR RAILWAY CARS
Original Filed Jan. 27, 1964 4 Sheets-Sheet 1

INVENTOR.
FRED TEMPLE
BY *A. A. Steinmiller*
ATTORNEY

April 4, 1967 F. TEMPLE 3,312,481
AUTOMATIC HOSE CONNECTOR FOR RAILWAY CARS
Original Filed Jan. 27, 1964 4 Sheets-Sheet 2

INVENTOR.
FRED TEMPLE
BY
*A. A. Steinmiller*
ATTORNEY

April 4, 1967  F. TEMPLE  3,312,481
AUTOMATIC HOSE CONNECTOR FOR RAILWAY CARS
Original Filed Jan. 27, 1964  4 Sheets-Sheet 3

INVENTOR.
FRED TEMPLE
BY
ATTORNEY

April 4, 1967   F. TEMPLE   3,312,481
AUTOMATIC HOSE CONNECTOR FOR RAILWAY CARS
Original Filed Jan. 27, 1964   4 Sheets-Sheet 4

INVENTOR.
FRED TEMPLE
BY
*A. A. Steinmiller*
ATTORNEY

United States Patent Office 3,312,481
Patented Apr. 4, 1967

3,312,481
AUTOMATIC HOSE CONNECTOR FOR
RAILWAY CARS
Fred Temple, Pittsburgh, Pa., assignor to Westinghouse Air Brake Company, Wilmerding, Pa., a corporation of Pennsylvania
Continuation of application Ser. No. 340,315, Jan. 27, 1964. This application Mar. 4, 1966, Ser. No. 536,546
4 Claims. (Cl. 285—12)

This application is a continuation of application Ser. No. 340,315, filed Jan. 27, 1964, and now abandoned.

This invention relates to automatic hose connectors for railway vehicles, and, more particularly, to an improved automatic hose connector characterized by novel support means imparting sufficient flexibility thereto for insuring positive coupling engagement of the respective mating members every time the vehicles are coupled together, means permitting adaptability to existing standard hose couplings by manual connection, and means permitting replacement of worn or damaged hoses without need of special equipment or tools.

Some of the automatic hose connectors heretofore devised have not proven reliable in that they could not always be depended upon to make a positive leak-proof connection when the railway cars were coupled together. Moreover, these automatic hose connectors were not useable with the standard manual type hose connectors, which, therefore, did not permit mixing of cars, in one train, some of which were equipped with automatic hose connectors while the others were equipped with the manual hose connector. Certain type of automatic hose connectors are presently employed on railway cars, such as are used in interurban subway systems or captive railway equipment assigned to a specific service area, as compared to interchange railway cars used in universal service. This type of automatic hose connector, as used on captive railway equipment, is structurally incorporated in a combined automatic car coupler and hose connector. Cars so equipped, however, cannot be used with cars equipped with the manual standard hose connector. Moreover, the cost of manufacturing the combined automatic car coupler and hose connector also makes the use thereof prohibitive on railway rolling stock used in interchange service.

The principal object of the present invention, therefore, is to provide an automatic hose connector which can be manufactured economically, can be applied to standard car couplers of railway rolling stock, can be depended upon to effect a positive leak-proof connection between the mating hoses on adjacent cars, will permit connection of the respective hoses of one car equipped with the automatic hose connector and of another car equipped with the standard manual type hose connector, and facilitates ready replacement of damaged or worn hoses when in service without necessity of special tools and equipment.

The automatic hose connector embodying the invention comprises two mating heads each of which is supported by a pair of flexible leaf springs attached to a bracket fixed on the head of an automatic car coupler, said flexible leaf springs thereby providing sufficient flexibility to compensate for any normal amount of misalignment of the coupler heads of two adjacent cars and assuring proper alignment and positive leak-proof connection of the hose connector heads when the cars are coupled together. Each of the mating heads of the hose connector is yieldingly pivotable in a horizontal plane, when in its installed service position, through a predetermined sector, in this instance 68°, to permit coupling of a standard manual type hose connector therewith when another car being coupled thereto is equipped with the standard manual type connector, said pivoting of the head being considered necessary to avoid excessive distortion of the hose with the manual type connector and possible pinching off of fluid flow therethrough. The hose nipple at the end of the hose connected to the automatic connector head is provided with an intergrally formed lug having a drill hole whereby the hose is mounted to said connector head by a pin fitting through said hole and a hole suitably situated in the connector head. Thus, a worn or damaged hose may be replaced as a unit with the nipples pre-installed thereon by simply removing the pin, which is provided with a ring, and then replacing said pin with the new hose in place. This eliminates any necessity for special tools or equipment if such replacement is necessary when the car so equipped is in service.

The invention is illustrated in the drawings attached hereto and wherein.

Figure 1:
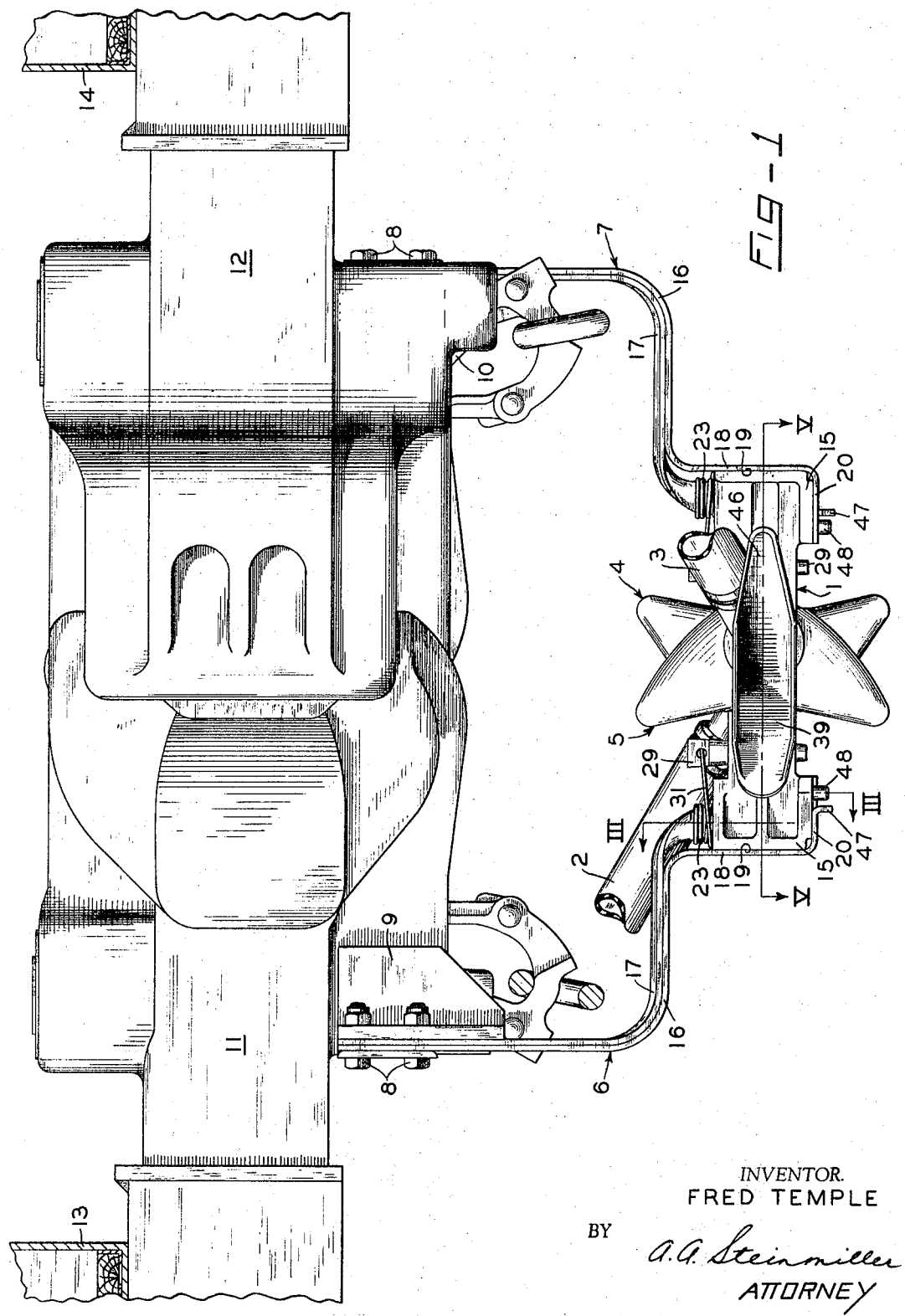
FIG. 1 is a schematic elevational view, generally in outline, showing the automatic hose connector as mounted on an automatic car coupler, both the connector and coupler being shown in respective engaged or locked relation.
Figure 5:
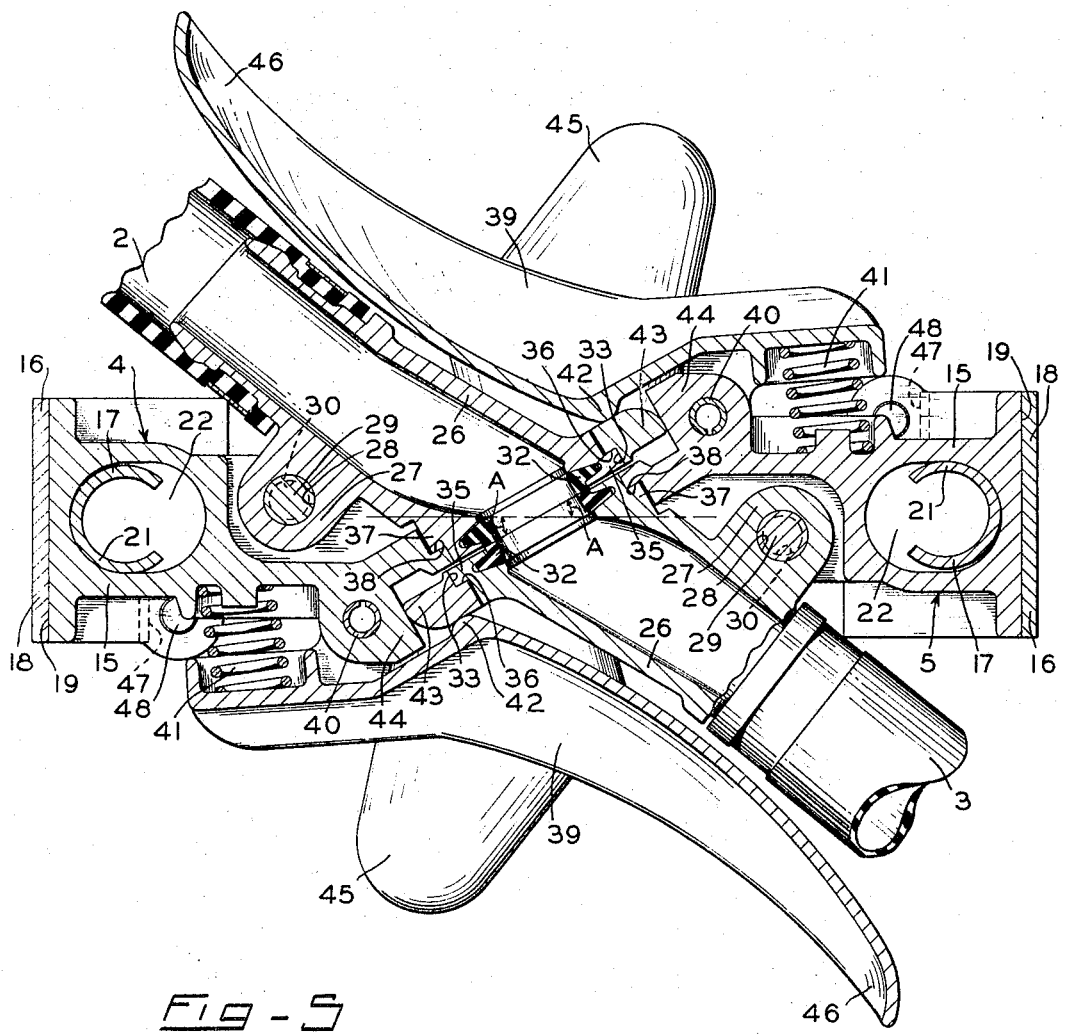
Figure 6:
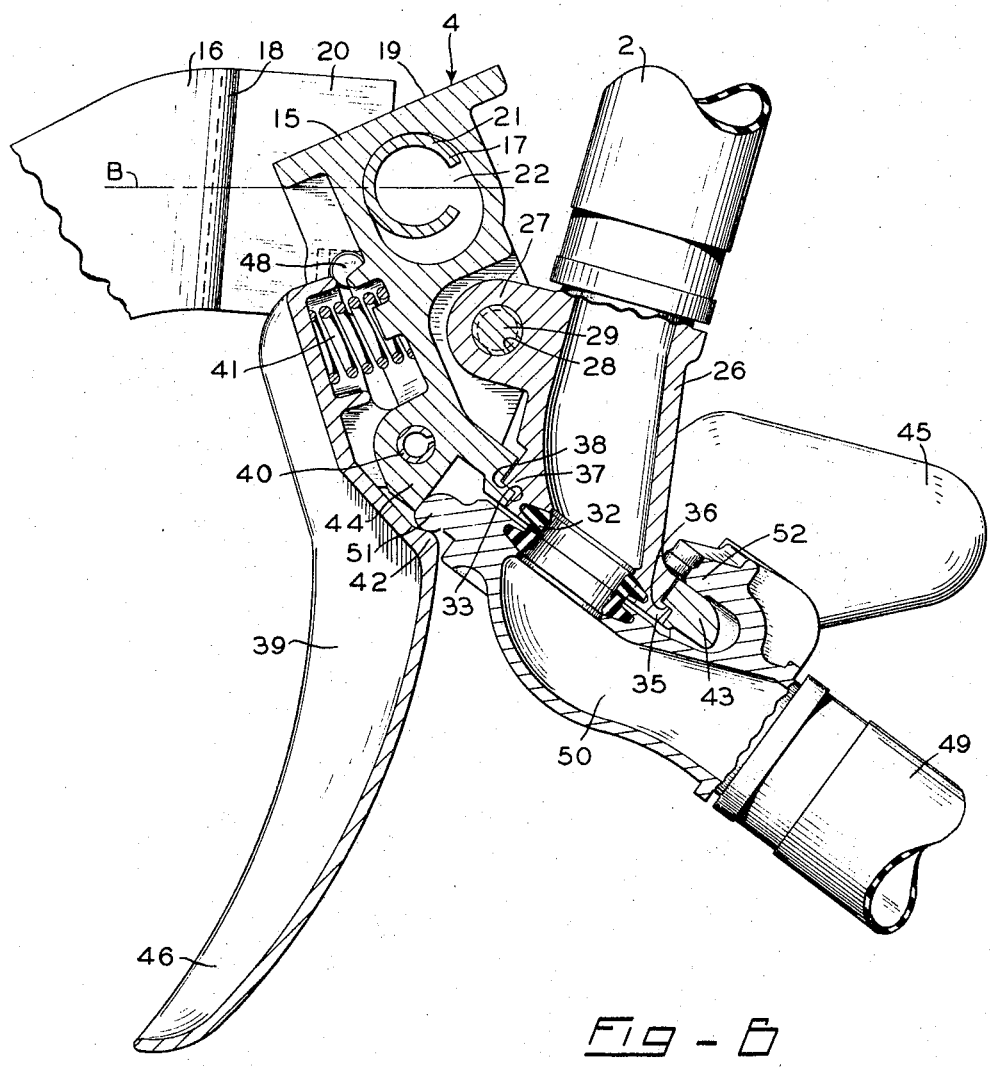

FIG. 5 is a horizontal sectional view, on a larger scale, of the mating heads of the automatic hose connector shown in FIG. 1 and taken along line V—V of FIG. 1 as viewed in the direction indicated by the arrows; and FIG. 6 is a horizontal sectional view, on the same scale as that of FIG. 5, showing one of the mating heads of the automatic hose connector pivoted out of its normal position as shown in FIG. 5, to which a standard manual hose connector is connected.

*Description and operation*

An automatic hose connector embodying the invention and designated generally by the reference numeral 1 in FIG. 1 of the drawings is shown in a connected disposition in which connection is effected between respective ends of two brake pipe hoses 2 and 3, only portions of which are shown. As is well known, the other ends of the brake pipe hoses 2 and 3 are connected to respective angle cocks (not shown) provided at each end of the brake pipes (not shown) on railway cars. The automatic hose connector 1 comprises two mating heads 4 and 5 each supported by respective pairs of flexible leaf springs 6 and 7, each pair, in turn, being fastened at one end by bolts 8 to respective brackets 9 and 10. The brackets 9 and 10 are illustratively shown as being fastened by suitable means (not shown) on the sides of respective coupler heads 11 and 12 of an automatic car coupler, said heads being supported on respective frames 13 and 14, only portions of which are shown, of two railway cars (not shown). The car coupler consisting of the coupler heads 11 and 12 is shown in a coupled disposition in which the cars are thus coupled together. Since the brackets 9 and 10 and, therefore, the pairs of springs 6 and 7 are, in this instance, fastened to the side of the coupler heads 11 and 12, respectively, each of said pairs of springs is preformed with a lateral distortion (see FIG.

2) so as to bring the respective mating heads 4 and 5 into axial alignment to insure coupling engagement thereof when two cars are coupled together.

The details of the two mating heads 4 and 5 comprising the automatic hose connector 1 may be seen more clearly in the horizontal sectional view shown in FIG. 5 of the drawings, and since the two heads are structurally similar, similar reference numerals will be used in identifying the components comprising said mating heads in the description thereof as set forth hereinafter. Of course, each of the mating heads 4 and 5 is carried on respective railway cars and is disposed at 180° relationship with the other.

Each of the mating heads 4 and 5 comprises a frame 15, one of which is supported at one end of the pair of leaf springs 6 while the other is supported at one end of the pair of leaf springs 7, the respective opposite ends of said pairs of leaf springs, as above noted, being fastened on the brackets 9 and 10, respectively. Each of the pairs of springs 6 and 7 is made up of an outer flexible leaf spring 16 and an inner flexible leaf spring 17, which are so shaped that when installed, as shown in FIG. 1, are disposed against each other and support the respective mating heads 4 and 5 in facing axial alignment as to cause said heads to engage and effect the connection between the two brake pipe hoses 2 and 3 when the two cars are moved into coupling position.

Figure 3:
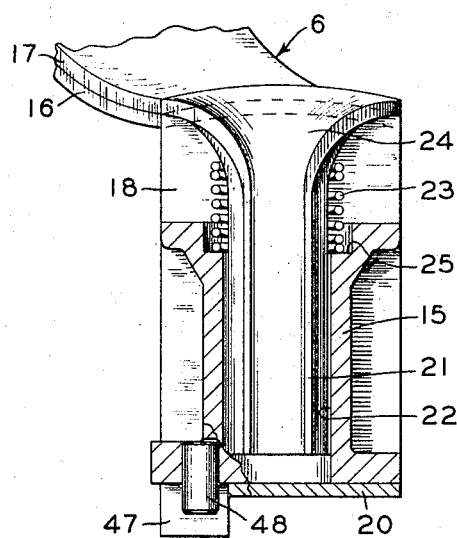
FIG. 3 is a vertical sectional view, on a larger scale, of certain details of one of the mating heads of the automatic hose connector shown in FIG. 1 and taken along line III–III of FIG. 1 as viewed in the direction indicated by the arrows.
Figure 4:
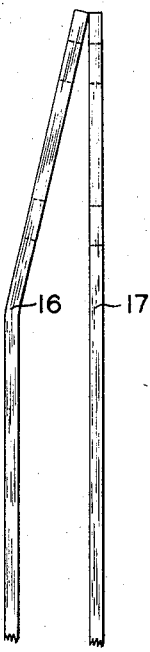
FIG. 4 is a view showing, on a larger scale, a portion of the leaf spring elements by which each of the mating heads of the automatic hose connector shown in FIG. 1 is supported on the car coupler head.

The outer leaf spring 16 is provided with a permanent bend adjacent the upper end bolted to the bracket 9 or 10, as shown in FIG. 4, for providing a constant biasing effect tending to hold the two springs 16 and 17 against each other. FIG. 4 shows the relationship between the leaf springs 16 and 17 in their respective unstressed conditions and shapes prior to installation on the bracket 9. The lower end of outer spring 16 is provided with a vertical flat portion 18, against which a flat back surface 19 of the frame 15 normally abuts, and a horizontal flat portion 20 extending perpendicularly from said horizontal flat portion and on which the bottom side of said frame rests. The inner leaf spring 17 is formed at its lower end into a cylindrical portion 21 (see FIG. 3) spaced away from the vertical flat portion 18 of outer spring 16 and in parallel relation thereto. The frame 15 has a vertically disposed bore or hole 22 so situated as to receive the cylindrical portion 21 of inner leaf spring 17. The frame 15 and the two leaf springs 16 and 17 must be assembled in their respective positions relative to each other before said leaf springs are bolted to the bracket 9 or 10, so that, upon bolting of the springs to the bracket, the biasing effect of the two springs toward each other caused by the bend in the outer spring 16, causes the cylindrical portion 21 of the inner spring 17 to biasingly hold the flat surface 19 of frame 15 against the vertical flat portion 18 of the outer spring 16. A coil spring 23 is compressed between a flared upper end 24 of the cylindrical portion 21 and a shoulder 25 surrounding the upper end of bore 22 (see FIG. 3) to thereby keep the frame 15 firmly seated on the horiozntal flat portion 20 and dampen any vibration and vertical movement of the frame and mating head relative to the springs 16 and 17.

Each of the brake pipe hoses 2 and 3 is connected, as above noted, at one end to the angle cock (not shown) at the end of the brake pipe (not shown) on the railway car, while the other end of said hose is clamped to a hose nipple 26 which has formed thereon a lug 27 having a drill hole 28 (see FIG. 5) by which said nipple and, therefore, the hose may be removably secured to the frame 15 by a tapered pin 29 (see FIG. 1) passing through said drill hole and a registering hole 30 formed in said frame. The tapered pin 29 is provided with a ring or annular handle 31 (see FIG. 1) which facilitates removal of the pin and can be used, by having one end of a chain (not shown) fastened thereto and the other end of the chain fastened to a fixed member of the device or car, to prevent loss of said pin. Thus, if it becomes necessary to replace a worn or damaged brake pipe hose, the pin 29 is simply removed to free the nipple 26 while the other end of the hose, which is also provided with a suitable connector or nipple (not shown) for connection to the angle cock (not shown), is disconnected from said angle cock and thereby removed. A replacement brake pipe hose, already having the nipples in place at both ends, is then installed in place of the discarded one by connecting the appropriate ends to the angle cock and the automatic hose connector mating head, respectively.

Figure 2:
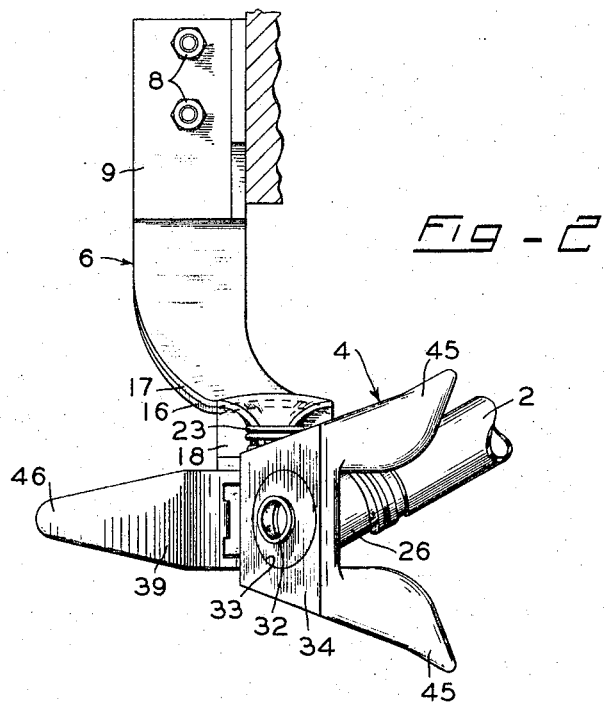
FIG. 2 is a vertical view, generally in outline, looking toward the face of the left-hand mating head of the automatic hose connector shown in FIG. 1.

Each of the nipples 26 is provided at its open end with a surrounding sealing ring 32, which rings are adapted for making sealing contact with each other when the mating heads 4 and 5 are engaged. The open end of nipple 26, and therefore sealing ring 32, is securely accommodated in an opening or socket 33 formed in a flat mating face 34 (see FIG. 2) provided on the frame 15 of the mating head, said mating face being disposed in a vertical plane passing through the axis of the mating head at a predetermined angle designated A in FIG. 5, so that, upon engagement of the mating heads 4 and 5 in a connected disposition, the two sealing rings 32 occupy a complementary sealing relationship to each other.

To prevent dislodgment of the nipple 26 from the mating head, the leading edge of said nipple has a lip 35 formed thereon which, when installed, fits underneath a retaining shoulder 36 correspondingly formed in the opening or socket 33 of the frame 15, while the rear edge of the nipple is provided with a heel 37 which rests on a correspondingly disposed shoulder 38 formed in said opening in a reversed relationship to said retaining shoulder and at 180° relative thereto. Thus, if, for example, the nipple 26 and the brake pipe hose connected thereto are to be installed in the mating head 4, the pin 29 is withdrawn, the lip 35 is slid underneath the retaining shoulder 36 and the heel 37 is then brought down to rest on the shoulder 38, after which the pin 29 is passed through hole 28 and into the registering hole 30.

The mating heads 4 and 5 each have a horn-like pressure lever 39 pivotally mounted in the frame 15 by a pin 40, said lever being pivotable about said pin in a horizontal plane passing through the axis of the automatic hose connector 1. A spring 41 is compressed between one end of pressure lever 39 and the frame 15 on one of the mating heads so as to pivotally bias said lever about the pin 40 in a counterclockwise direction, as viewed in FIG. 5 of the drawings, whereby a knob-like projection 42 formed on said lever on the opposite side of said pin exerts pressure on a leading portion 43 of the other mating head adjacent the lip 35 of nipple 26. Of course, the pressure lever 39 on the other mating head is similarly arranged to exert pressure on the leading portion 43 of the one mating head adjacent the lip 35 of the respective nipple 26. Thus, when the two mating heads are in a connected disposition, the respective pressure levers 40 exert a mutual pressure on the respective leading portions 43 of the mating heads 4 and 5 to assist in maintaining sealing contact between the two sealing rings 32. A stop 44 is provided on each frame 15 against which the respective leading edges 43 abut for limiting engagement of the two mating heads 4 and 5 and thereby insuring proper registry and sealing contact of the sealing rings 32. The stop 44 also serves as a rest against which the pressure lever 39 is biased by the spring 41, thereby determining the normal position of said pressure lever when the two mating heads 4 and 5 are separated.

Each of the mating heads 4 and 5 also has formed thereon a pair of radially extending wing-like guide members 45 so disposed as to provide a shallow V-shaped channel for guiding a horn-like extension 46 of the pressure lever 39 as the two mating heads approach each other for engagement, the guide members of the one mating head serving to guide the extension of the pressure lever on the other mating head and vice versa. Thus, if the two mating heads 4 and 5 are not precisely aligned, the guide members 45 and the pressure levers 39 will insure proper alignment as the two mating heads engage, while the flexible leaf springs 6 and 7 provide the necessary flexibility for alignment adjustment of the mating heads.

A corner of the horizontal flat portion 20 of each of the leaf springs 16, as may be seen in FIGS. 1 and 3 of the drawings, is bent downwardly to form a vertically disposed tab or stop 47 against which a pin 48 carried vertically in the frame 15 of each of the mating heads is adapted to abut and thereby act as a fulcrum when the mating head associated with said frame is pivoted about the cylindrical portion 21 of leaf spring 17 for a purpose to be hereinafter disclosed.

The operation of the automatic hose connector 1 is fully automatic in effecting either a connection or a disconnection of the brake pipe hoses 2 and 3 when two cars equipped with said automatic hose connectors are coupled or uncoupled, respectively. During coupling of the two cars, as the mating heads 4 and 5 of the automatic hose connector 1 approach each other and make initial contact, the extensions 46 of the pressure levers 39 are guided by the wing-like guide members 45 into the respective shallow V-shaped channels formed by said guide members. The leaf springs 6 and 7 are so positioned on the coupler heads 11 and 12, respectively, as to not only effect full and proper engagement of the mating heads 4 and 5 at the same time that the coupled heads 11 and 12 are fully engaged, but to also exert a constant axially directed biasing force on said mating heads urging them toward each other after they are fully engaged to thereby insure constant sealing contact between the two sealing rings 32. The mating surfaces 34 assist the mating heads 4 and 5, along with the guide member 45 and the extension 46, to move into engagement with each other until the leading portions 43 contact the stops 44, respectively. The leading portions 43 are rounded on the side adjacent the knob-like projections 42 formed on the pressure levers 39 to permit said leading portions to slide underneath said knob-like projections, which, as above noted, bear on said leading portions with pressure from the springs 41 acting through the pressure levers. The sealing contact between the sealing rings 32 is thus maintained by the pressure levers 39 and by the cramming action of the leaf springs 6 and 7 caused by the two cars being coupled.

During coupling of the two cars and connection of the two mating heads 4 and 5, if the mating heads are not precisely aligned, the arrangement of said mating heads on the leaf springs 6 and 7 permits any necessary adjustment in alignment of said heads. With the mating heads being pivotable about the cylindrical portion 21 of spring 17, each head can effect horizontal angular displacement while the flexibility of said spring 17 and spring 16 permits angular vertical displacement if necessary.

When the cars are uncoupled, the mating heads 4 and 5 of the automatic hose connector 1 are simply separated by sliding out and away from each other.

FIG. 6 shows how the mating head 4 of the automatic hose connector 1 on one car can be connected to a brake pipe hose 49, usually made of a resilient material such as rubber, on another car which is equipped with a conventional manual type hose nipple and connector 50. The manual type hose connector 50, similar to the nipple 26 on the automatic type, is provided with a sealing ring 32 and a leading portion 51 which abuts against the stop 44 of mating head 4. The connector 50 is further provided with a clamping portion 52 under which the leading portion 43 of the mating head 4 is engaged when the mating head 4 and connector 50 are engaged.

To connect the manual type connector 50, which must be done manually, to the mating head 4, for example, of the automatic type hose connector 1, said mating head is pivoted clockwise out of a normal orientation or position, in which the flat surface 19 of the frame 15 rests against the vertical flat portion 18 of leaf spring 16 (as shown in FIG. 5), about the cylindrical portion 21 of the leaf spring 17 by using, as a handle, the extension portion 46 of the pressure lever 39. After a certain predetermined initial amount of angular displacement of the mating head 4 in a clockwise direction, the pin 48 abuts against the stop 47 and thereafter acts as a fulcrum as the mating head is further pivoted through a sufficient degree of displacement which will permit the connector 50 of the brake pipe hose 49 to be readily installed in the mating head 4. The knob-like projection 42 on the pressure lever 39 applies pressure to the hose connector 50 for maintaining sealing contact between the sealing rings 32. The fulcrum action of pin 48 and stop 47 causes the flat surface 19 of the frame 15 to be moved away, for a purpose to be hereinafter disclosed, due to the flexibility of both leaf springs 16 and 17, from the flat vertical portion 18 of leaf spring 16, whereupon further angular displacement of the mating head 4 is effected to the extent necessary to accept the hose connector 50, or to what may be called a connecting position. Normally, the mating head 4 must be displaced approximately 70° from the longitudinal axis of the connector, though not necessarily limited to said amount, in order to accommodate the conventional manual type hose connector.

Once engaged with or connected to the hose connector 50, the mating head 4 remains in substantially the displaced position in which it is shown in FIG. 6 of the drawings, that is, approximately 70° from the longitudinal axis. The biasing action of the leaf springs 16 and 17, of course, tends to restore the mating head 4 to its normal position. Being connected to the mating head 4, however, and due to its normal rigidity, the brake pipe hose 49 resists and prevents any appreciable return of the mating head 4 to its normal position. It should also be understood that the springs 16 and 17 are designed accordingly to exert the desired biasing forces compatible with the resistance offered thereto by the hose 49. Of course, such conditions as temperature and age of the hose 49 may have some effect on the rigidity thereof, and in such event the mating head 4 may move a greater degree toward its normal position after the hose 49 has been connected thereto. Thus, any possibility of the hose 49 becoming kinked, which might occur if the mating head 4 did return to its normal position with the hose 49 connected thereto, is eliminated and flow of pressurized fluid therethrough is assured.

When the mating head 4 and the hose connector 50 are manually disconnected, the cooperative biasing action of the leaf springs 16 and 17 restores the mating head 4 to its normal position with the flat surface 19 of the frame 15 against the flat vertical portion 18 of the leaf spring 16.

As above noted, abutment of the pin 48 against the stop 47 during pivotal movement of the mating head 4 (or 5) from its normal position to its connecting position, causes the flat surface 19 on the frame 15 to be moved completely out of contact with the flat vertical portion 18 of the leaf spring 16. The purpose of such structure is not only to eliminate frictional contact between the frame 15 and the spring 16 during pivotal movement of the mating head, but to also provide for automatic and complete return of the mating head to its normal position after the manual hose connector 50 has been disconnected. If the surface 19 were not moved away from the flat portion 18, the corner portion of the frame 15 adjacent the pressure lever 39 would remain in contact with and move along said flat portion 18, during pivotal movement of the mating head to its connecting position, until said corner moved over or above, as viewed in FIG. 6, a "dead center" or line of action of the biasing forces between leaf springs 16 and 17, said line of action being identified by the reference character B in the drawing. Thus, in the absence of such means as the pin 48 and stop 47, the mating head 4 would, once moved past the "dead center" line B, be locked on that side by the biasing action of the leaf springs 16 and 17 and, consequently, the mating head 4 would not be automatically restored to its normal orientation upon disconnection of the hose 49 from the mating head 4. The cooperative action of the pin 48 and stop 47 accordingly assure restoration of the mating head 4 to its normal orientation.

Though not shown in the drawings, pin and stop arrangements, in addition and similar to the pins 48 and stops 47, could be provided, respectively, on the mating heads 4 and 5 on the other sides of said mating heads to insure return thereof to their respective normal positions if for any reasons they should be rotated in a counterclockwise direction out of their respective normal positions.

Having now described the invention, what I claim as new and desire to secure by Letters Patent is:

1. An automatic hose connector for railway vehicles equipped at each end thereof with an automatic coupler whereby adjacent vehicles may be coupled together to form a train and with a hose the free end of which is connectable to the free end of the hose on an adjacent vehicle for conducting fluid under pressure between two adjacent coupled vehicles, said automatic hose connector comprising:
   (a) a first mating head flexibly supported by the coupler head on one vehicle and having arranged thereon the connecting end of the respective hose of the one vehicle,
   (b) a second mating head flexibly supported by the coupler head on the adjacent end of an adjacent vehicle and having arranged thereon the connecting end of the respective hose on the adjacent vehicle,
   (c) said mating heads being posiitonally alined for making coupling engagement with each other to effect sealing contact between the connecting ends of the respective hoses upon coupling of the vehicles, each of said mating heads being provided with a recess, and
   (d) respective spring means for flexibly supporting each of said mating heads on the respective coupler heads, each of said respective spring means comprising:
      (i) a first leaf spring, and
      (ii) a second leaf spring complementing said first leaf spring,
      (iii) said first leaf spring and said second leaf spring being clamped together at one end and anchored at said one end to the respective coupler head,
      (iv) one of the leaf springs having a permanent deformity yieldable for exerting a constant biasing effect for maintaining the two leaf springs in close contact with each other, and for axially biasing the respective mating head toward the other mating head for maintaining positive sealing contact between the connecting ends of the hoses,
      (v) one of said leaf springs being provided at the other end opposite its said one end with a flat horizontal portion on which the respective mating head associated therewith rests, and
      (vi) the other of said leaf springs being provided at the other end opposite its said one end with a cylindrical portion extending into said recess in the respective mating head,
      (vii) said flat horizontal portion and said cylindrical portion cooperating to provide a flexible support means for the respective mating head.

2. An automatic hose connector, as defined in claim 1, wherein said one of said leaf springs is provided, between its said one end and its said other end, with a vertical flat portion adjacent to and at right angles with said horizontal flat portion and against which vertical flat portion a complementary flat surface formed on the respective mating head is pressed by said biasing effect between the two leaf springs, thereby providing a yielding resistance to angular displacement of the respective mating head out of its normal orientation.

3. An automatic hose connector, as defined in claim 2, further characterized by cooperating means partly on each mating head and partly on the corresponding said one leaf spring for separating the flat surface on the mating head from the vertical flat portion of said one leaf spring when the angle of displacement of the mating head from its normal orientation exceeds a certain amount for assuring automatic restoration of the mating head to its normal orientation upon removal of the displacing force on the mating head.

4. A hose connector for railway vehicles equipped at each end thereof with an automatic coupler head whereby adjacent vehicles may be coupled together to form a train, said hose connector comprising:
   (a) an automatic mating head having a normal position in which it is axially aligned with a counterpart automatic mating head on an adjacent vehicle for coupling therewith,
   (b) spring means secured at one end thereof to the coupler head,
   (c) said mating head being pivotally mounted on the other end of said spring means so as to be angularly displaceable out of its said normal axial alignment, said spring means flexibly supporting and maintaining said mating head in normal alignment with said counterpart mating head,
   (d) a hose nipple, means for removably securing said hose nipple on said mating head in a posiiton such that the end of the hose nipple optionally contacts the end of a similarly mounted hose nipple on the counterpart mating head when the mating head is coupled thereto or a manually connectable hose nipple, carried on an adjacent vehicle independently of a counterpart mating head, which may be manually connected thereto when the mating head is displaced out of its said normal axial alignment, and,
   (e) a pressure lever pivotally mounted on said mating head, resilient means biasing said pressure lever so as to be effective in cooperation with said mating head to yieldingly hold the hose nipple on the counterpart mating head or the manually connectable hose nipple, in sealed relation to the hose nipple on the said mating head.

References Cited by the Examiner
UNITED STATES PATENTS

| | | | |
|---|---|---|---|
| 655,997 | 8/1900 | Spurlock | 285—12 |
| 743,935 | 11/1903 | Schrader | 285—63 |
| 959,152 | 5/1910 | McElroy | 285—63 |
| 1,981,004 | 11/1934 | Robinson | 285—63 |
| 2,004,644 | 6/1935 | Woernley | 285—63 |
| 2,009,830 | 7/1935 | Woernley | 285—63 |
| 2,819,913 | 1/1958 | Kayler | 285—63 |

CARL W. TOMLIN, *Primary Examiner.*

THOMAS F. CALLAGHAN, *Examiner.*